US006510400B1

United States Patent
Moriyama (10) Patent No.: US 6,510,400 B1
(45) Date of Patent: Jan. 21, 2003

(54) TEMPERATURE CONTROL CIRCUIT FOR CENTRAL PROCESSING UNIT

(75) Inventor: Shuichi Moriyama, Niigata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/536,149

(22) Filed: Mar. 28, 2000

(30) Foreign Application Priority Data

Mar. 31, 1999 (JP) .......................................... 11-094194

(51) Int. Cl.[7] .............................................. G06F 15/00
(52) U.S. Cl. ....................... 702/132; 361/686; 713/322
(58) Field of Search .............................. 702/130, 132, 702/134; 713/300, 320, 322, 501; 700/29, 46; 361/686

(56) References Cited

U.S. PATENT DOCUMENTS

| | | | | |
|---|---|---|---|---|
| 5,115,225 A | * | 5/1992 | Dao et al. ..................... | 340/584 |
| 5,230,055 A | * | 7/1993 | Katz et al. ................... | 713/300 |
| 5,287,292 A | * | 2/1994 | Kenny et al. ................ | 702/132 |
| 5,422,806 A | * | 6/1995 | Chen et al. .................... | 700/29 |
| 5,477,417 A | * | 12/1995 | Ohmori et al. ............. | 361/695 |
| 5,490,059 A | * | 2/1996 | Mahalingaiah et al. ....... | 700/46 |
| 5,493,684 A | * | 2/1996 | Gephardt et al. ........... | 713/322 |
| 5,502,838 A | * | 3/1996 | Kiniskins .................... | 713/501 |
| 5,930,110 A | * | 7/1999 | Nishigaki et al. ........... | 361/686 |
| 6,029,119 A | * | 2/2000 | Atkinson .................... | 702/132 |
| 6,158,012 A | * | 12/2000 | Watts, Jr. .................... | 713/322 |
| 6,243,656 B1 | * | 6/2001 | Arai et al. .................. | 702/132 |

* cited by examiner

Primary Examiner—John S. Hilten
Assistant Examiner—John Le
(74) Attorney, Agent, or Firm—Sughrue Mion, PLLC (57) ABSTRACT

A CPU temperature control circuit is provided that can vary the clock frequency and the power source voltage of a central processing unit (CPU) while the CPU meets the operational specifications. The comparison circuit 8 compares the temperature of the CPU 1 measured by the CPU temperature sensor 2 with temperature information previously stored in the ROM 6. The CLK and power-source control circuit 9 switches the clock frequency from a high frequency to a low frequency when the temperature of the CPU 1 becomes high. Then, the CKL and power-source control circuit 9 switches the power source voltage from a high voltage to a low voltage at the time the timer 12 counts up. When the temperature of the CPU 1 becomes low, the CLK and power-source control circuit 9 switches the power source voltage from a low voltage to a high voltage. Then, the CLK and power-source control circuit 9 switches the clock frequency from a low frequency to a high frequency at the time the timer 13 counts up.

16 Claims, 7 Drawing Sheets

| DNa | DNb | CPU POWER-SOURCE VOLTAGE |
|-----|-----|--------------------------|
| H   | H   | 1.6 V                    |
| L   | H   | 1.5 V                    |
| X   | L   | 1.4 V                    |

TEMPERATURE CONTROL CIRCUIT FOR CENTRAL PROCESSING UNIT

BACKGROUND OF THE INVENTION

The present invention relates to a temperature control circuit for central processing units (CPUs) used for personal computers.

Conventionally, in order to prevent breakage and operational failure of a CPU, there are the method of cooling a heat-producing portion by a forced-air cooling fan and the method of improving the heat dissipation efficiency using a heat sink equipped on a heat-producing portion. However, these methods have the drawback of leading to an increase in weight and an increase in cost of the system.

On the other hand, the method is known of lowering the clock frequency and the power source voltage supplied to the CPU when the temperature of the CPU rises, thus suppressing the heat production from the CPU. However, in this prior art, since the clock frequency and the power source voltage are not switched controllably and properly, the operational specifications of the CPU are not satisfied during the switching operation, so that the CPU results often in its operational failure.

SUMMARY OF THE INVENTION

The present invention is made to solve the above-mentioned problems.

Moreover, the objective of the invention is to provide a circuit for controlling the temperature of a central processing unit (CPU). The CPU temperature control circuit can vary the clock frequency of the CPU and the power source voltage thereof while the operational specifications of the CPU are satisfied.

Another object of the present invention is to provide a method of controlling the temperature of a central processing unit.

The objective of the present invention is achieved by a temperature control circuit used for a central processing unit, wherein the temperature of the central processing unit is controlled, the central processing unit receiving clock pulses output from a clock generator and operating a power source voltage output from a power source circuit, comprising temperature measuring means for measuring the temperature of the central processing unit; a storage section for previously storing a reference value in temperature of the central processing unit; a comparator for comparing a measurement result of the temperature measuring means with the reference value stored in the storage section; and control means for switching a clock frequency from a high frequency to a low frequency when the temperature measurement result is larger than the reference value based on an output from the comparator and then switching the power source voltage from a high voltage to a low voltage, and for switching the power source voltage from a low voltage to a high voltage when the temperature measurement result is lower than the reference value and then switching the clock frequency from a low frequency to a high frequency.

In the temperature control circuit for a central processing unit, the control means comprises a first timer to which a changeover time of the clock frequency is previously set and a second timer to which a changeover time of the power source voltage is previously set. The clock frequency is switched based on an output from the first timer and the power source voltage is switched based on an output from the second timer.

In the temperature control circuit for a central processing unit, the control means comprises a third first timer to which the time the clock frequency changes from a high frequency to a first low frequency is previously set and a fourth timer to which the time the clock frequency changes from the first low frequency to a second low frequency is previously set. The power source voltage is switched from the high voltage to a first low voltage at the time the set time of the third timer has passed and the power source voltage is switched from the first low voltage to the second low voltage at the time the set time of the fourth timer has passed.

According to the second aspect of the present invention, a temperature control circuit used for a central processing unit, wherein the temperature of the central processing unit is controlled, the central processing unit receiving clock pulses output from a clock generator and operating on a power source voltage output from a power source circuit, comprising control means for switching the clock frequency from a high frequency to a low frequency when an external temperature control signal indicates a temperature drop and then switching the power source voltage from a high voltage to a low voltage, and for switching the power source voltage from a low voltage to a high voltage when the temperature control signal indicates a temperature drop release and then switching the clock frequency from a low frequency to a high frequency.

In the temperature control circuit for a central processing unit, the temperature control signal is a signal which notifies whether the central processing unit is driven by a battery or an ac adapter.

In the temperature control circuit for a central processing unit, the temperature control signal comprises an output of a register, the register being written by the central processing unit.

In the temperature control circuit for a central processing unit, the temperature control signal comprises an operation halt signal output to the central processing unit.

In the temperature control circuit for a central processing unit, the control means comprises a first timer to which the changeover time of the clock frequency is previously set, and a second timer to which the changeover time of the power source voltage is previously set. The clock frequency is switched based on an output from the first timer and the power source voltage is switched based on an output from the second timer.

According to the third aspect of the invention, a method of measuring the temperature of a central processing unit, the central processing unit receiving clock pulses output from a clock generator and operating on a power source voltage output from a power source circuit, comprises the steps of previously storing a reference value in temperature of the central processing unit; measuring the temperature of the central processing unit; comparing a measurement result with the reference value stored; switching a clock frequency from a high frequency to a low frequency when the temperature measurement result is larger than the reference value and then switching the power source voltage from a high voltage to a low voltage; and switching the power source voltage from a low voltage to a high voltage when the temperature measurement result is lower than the reference value and then switching the clock frequency from a low frequency to a high frequency.

In the temperature control method, the switching step comprises steps of previously setting a first time the clock frequency is changed and a second time the power source voltage is changed, and changing the clock frequency based on the first time and the power source voltage based on the second time.

In the temperature control method, the switching step comprises steps of previously setting a third time the clock frequency changes is changed from a high frequency to a first low frequency and a fourth time the clock frequency changes from the first low frequency to a second low frequency is previously set; changing the power source voltage from the high voltage to a first low voltage at the time the third time has passed, and changing the power source voltage from the first low voltage to the second low voltage at the time the fourth time has passed.

According to the fourth aspect of the invention, a method of measuring the temperature of a central processing unit, the central processing unit receiving clock pulses output from a clock generator and operating on a power source voltage output from a power source circuit, comprises the steps of switching the clock frequency from a high frequency to a low frequency when an external temperature control signal indicates a temperature drop and then switching the power source voltage from a high voltage to a low voltage; and switching the power source voltage from a low voltage to a high voltage when the temperature control signal indicates a temperature drop release and then switching the clock frequency from a low frequency to a high frequency.

In the temperature control method, the temperature control signal is a signal which notifies whether the central processing unit is driven by a battery or an ac adapter.

In the temperature control method, the temperature control signal comprises an output of a register, the register being written by the central processing unit.

In the temperature control method, the temperature control signal comprises an operation halt signal output to the central processing unit.

In the temperature control method, the switching step comprises steps of previously setting a first time the clock frequency is changed and a second time the power source voltage is changed; and changing the clock frequency based on the first time and the power source voltage based on the second time.

BRIEF DESCRIPTION OF THE INVENTION

This and other objects, features, and advantages of the present invention will become more apparent upon a reading of the following detailed description and drawings, in which.

DESCRIPTION OF THE EMBODIMENTS

Figure 1:
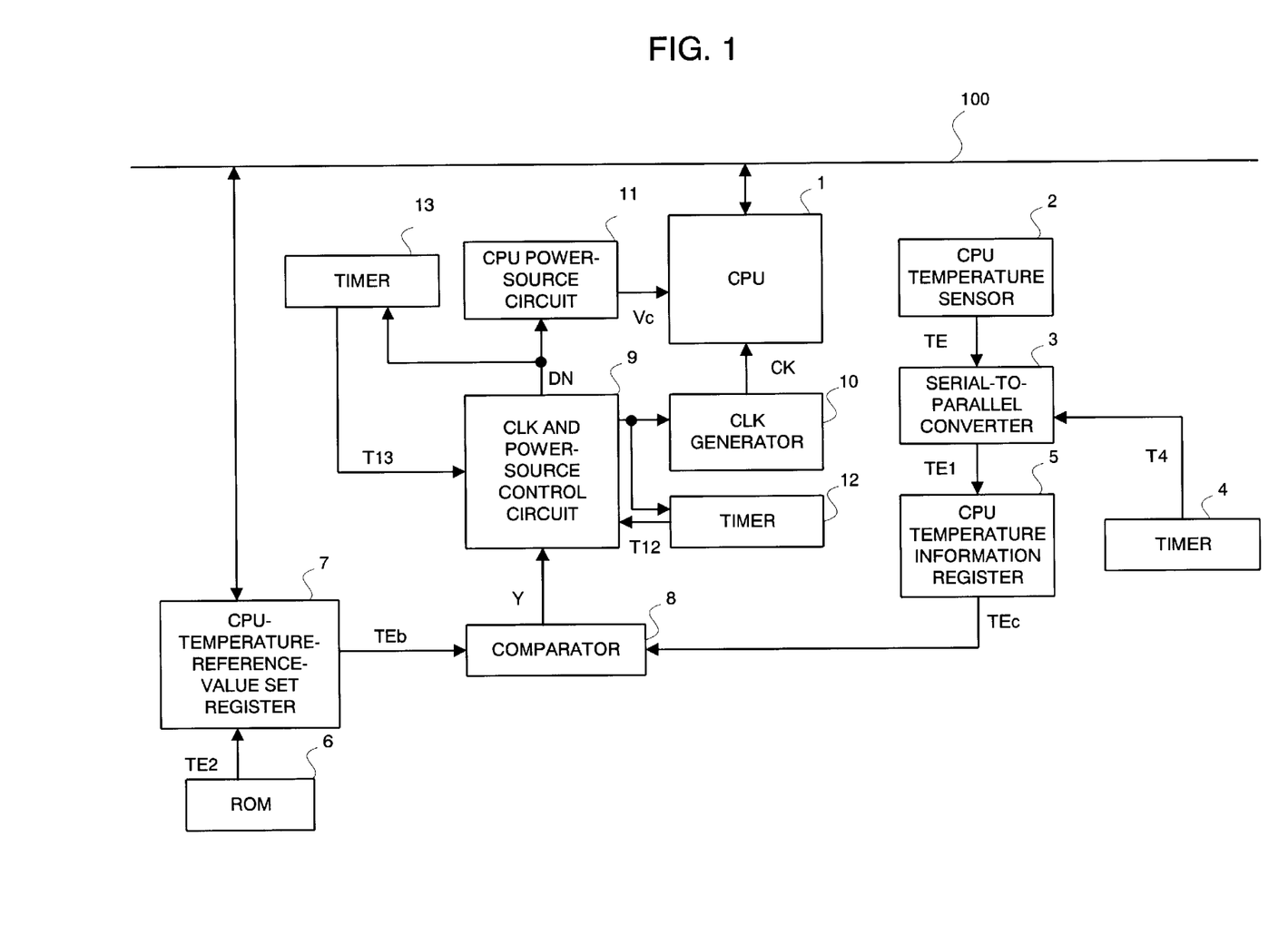
FIG. 1 is a block diagram illustrating the configuration of a temperature control circuit according to a first embodiment of the present invention.

The temperature control circuit according to embodiments of the present invention will be described below in detail with reference to the attached drawings. FIG. 1 is a block diagram illustrating the configuration of a temperature control circuit according to the first embodiment of the present invention. Referring to FIG. 1, numeral 1 represents a central processing unit (CPU) of which its temperature is controlled. Numeral 2 represents a CPU temperature sensor mounted near the CPU 1. The CPU temperature sensor 2 always measures the temperature of the CPU 1 and then sends the measured results as temperature data to a serial to parallel converter 3. The serial to parallel converter 3 converts the temperature data TE into parallel temperature data TE1 and then outputs it to a CPU temperature information register 5.

Numeral 4 represents a timer that operates at constant intervals. The timer 4 produces a timing signal for outputting parallel temperature data TE1, to the serial to parallel converter 3. The CPU temperature information register 5 stores the temperature data TE1 from the serial to parallel converter 3. A ROM (read-only memory) 6 stores the reference value in temperature of the CPU 1. A CPU temperature reference value set register 7 stores data from the ROM 6 or temperature reference value data set by the CPU 1.

A comparison circuit 8 compares the output data TEb of the CPU temperature reference value set register 7 with the output data TEc of the CPU temperature information register 5. In this case, the comparison operation is carried out every time the CPU temperature information of the CPU temperature register 5 is updated with the timing of the timer 4. A CLK (clock) and power-source control circuit 9 (to be later described in detail) controls the CLK generator 10 and the CPU power source circuit 11 according to results of the comparison circuit 8.

The CLK generator 10 supplies clock (CK) pulses to the CPU 1. The clock frequency to the CPU 1 can be selectively switched to a high frequency (66 MHz) or a low frequency (33 MHz) according to an indication from the CLK and power-source control circuit 9. Numeral 11 represents a CPU power source circuit that supplies a power source voltage to the CPU 1. A high voltage (1.6 V) or a low voltage (1.4 V) is supplied to the CPU 1. The CLK and power-source control circuit 9 controls the output voltage.

Numeral 12 represents a timer. The function of the timer 12 will be described here. That is, in order to guarantee the normal operation of the CPU 1 in the mode switching process, the clock frequency is first changed from a high frequency to a low frequency and then the power source voltage is changed from a high voltage to a low voltage. In contrast, when the clock frequency is changed from a low frequency to a high frequency, the power source voltage is first changed from a low voltage to a high voltage and then the clock frequency is changed from a low frequency to a high frequency. If such a switching mode is not implemented, the case may occur where although the clock frequency of the CPU 1 is high, the power source voltage of the CPU 1 is low. As a result, the CPU 1 has no operational margin, thus giving rise to an operational failure.

In the present embodiment, the timer 12 is prepared to prevent an operational failure of the CPU 1. The timer 12 notifies the CLK and power-source control circuit 9 that the switching of the output clock frequency of the CLK generator 10 has been ended.

Recently, a large number of CPUs include a PLL (phase locked loop) for clocking. The clock frequency is not dynamically changed from 66 MHz to 33 MHz. Instead, the switching operation is performed using the SWEEP function prepared in the recent CLK generators. The SWEEP function is the function of gradually varying the clock frequency. For instance, when a frequency of 66 MHz is changed to a frequency of 33 MHz, the clock frequency is gradually changed to 33 MHz by gradually stepping down it in the decreasing order of 66 MHz, 65 MHz, 64 MHz, . . . , in units of picosecond. The MK1491 series (manufactured by Microclock Co. in US), for example, are listed as a clock generator with the SWEEP function. A fixed period of time is required to complete the frequency switching by the SWEEP function. A time period needed for the clock switching is set to the timer 12. The timer 12 outputs a time-out signal to notify to the CLK and power-source control circuit 9 that the clock frequency has been changed.

The operation of the timer 13 will be explained here.

The CPU power source circuit 11 is configured of an analog circuit in a DC/DC converter mode. For that reason, it will be a period of time before a high voltage is completely changed to a low voltage, and vice versa. The time needed to completely switch the output voltage of the CPU power source circuit 11 is set to the timer 13. The timer 13 outputs a time-out signal to notify the CLK and power-source control circuit 9 that the output voltage of the CPU power source circuit 11 has been completely changed.

Next, the operation of the system with the above configuration will be explained using the flow chart of FIG. 2 and the operational timing chart of FIG. 3. Now, it is assumed that the reference temperature value previously stored in the ROM 6 is 65° C. Moreover, in the initial state of the CPU 1 immediately after the power source is turned on, it is assumed that the clock frequency is a high frequency and that the power source voltage is a high voltage and that the temperature is a room temperature (ranging 10° C. to 20° C.).

When the power source is turned on (step S101 of FIG. 2), the reference temperature value (65° C.) of the CPU 1, previously stored in the ROM 6, is set to the CPU temperature reference value set register 7 (step S102). Then, the reference temperature value is transmitted as the reference value temperature information TEb to the comparator 8.

The CPU temperature sensor 2 measures the temperature of the CPU 1 in real time and then always outputs the serial temperature data TE. The serial temperature data TE is transmitted to the serial to parallel converter 3. The serial to parallel converter 3 converts the serial temperature data TE into parallel temperature data TE1 and then outputs it to the CPU temperature information register 5 with the timing of the output signal T4 of the timer 4 ((a) of FIG. 3). The CPU temperature information register 5 temporarily stores the transmitted parallel temperature data TE1 and then outputs it as CPU temperature information TEc to the comparator 8.

The comparator 8 compares the CPU temperature information TEc with the reference value temperature information TEb (step S103). When the CPU temperature information TEc is lower than the reference value temperature information TEb, the comparator 8 holds the comparison result Y in an "LOW" state. When the comparison result Y remains "LOW", the CLK and power-source control circuit 9 maintains the clock frequency of the CPU 1 and the output of the power source voltage without any change.

Figure 3:
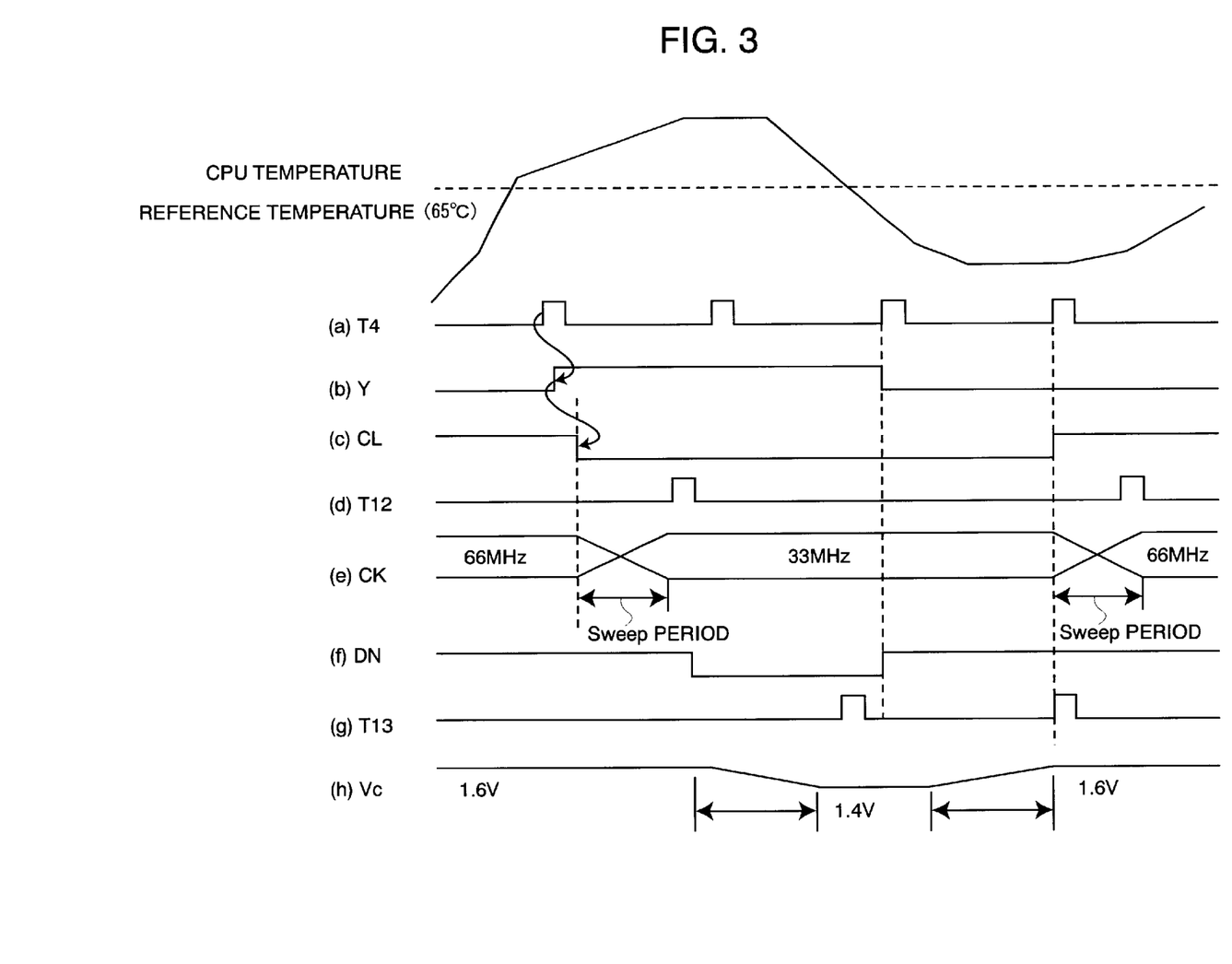
FIG. 3 is a timing chart of the circuit configuration shown in FIG. 1.

Next, when the CPU temperature information TEc is higher than the reference value temperature information TEb, the comparator 8 makes the comparison result Y in a high level ((b) of FIG. 3). When the comparison result Y is switched to "HI", the CLK and power-source control circuit 9 makes the CLK changeover signal CL in the "LOW" level ((c) of FIG. 3) and then outputs it to the CLK generator 10 and the timer 12.

When the CLK changeover signal CL is in the "LOW" level, the CLK generator 10 gradually changes the clock frequency from a high frequency to a low frequency (step S104). The timer 12 starts its count-up operation (step S105). When the timer 12 completes its counting operation, it outputs the time-out signal T12 ((d) of FIG. 3) to notify the CLK and power-source control circuit 9 that the output frequency of the CLK generator 10 has been completely changed.

In response to the time-out signal T12, the CLK and power-source control circuit 9 changes the voltage changeover signal DN ((f) of FIG. 3) from "HI" to "LOW" and then transmits it to the CPU power source voltage circuit 11 and the timer 13. When the voltage changeover signal DN is "LOW", the CPU power source voltage circuit 11 changes the CPU power source voltage Vc from a high voltage (1.6 V) to a low voltage (1.4 V) (step S106). The timer 13 starts its count-up operation. When the counting operation ends (step S107), the timer 13 transmits the time-out signal T13 ((g) of FIG. 3) to notify the CLK and power source control circuit 9 that the output voltage of the CPU power source voltage circuit 11 has been completely changed.

Thereafter, the CPU temperature sensor 2 always transmits the data TE about the temperature of the CPU 1 to the serial to parallel converter 3. The serial and parallel converter 3 outputs parallel temperature data TE1 every period set by the timer 4. The CPU temperature information register 5 temporarily stores the parallel temperature data TE1 and then transmits it as the CPU temperature information TEc to the comparator 8. The comparator 8 continuously compares the reference value temperature TEb with the CPU temperature TEc every period set by the timer 4 until the temperature of the CPU 1 is less than the reference value temperature TEb (step S108).

Next, when the temperature of the CPU 1 is less than the reference value temperature TEb (step S108), the comparator 8 outputs the comparison result Y ((b) of FIG. 3) in a "LOW" level. When the comparison result Y changes to a "LOW" level, the CLK and power-source control circuit 9 first changes the voltage changeover signal DN ((f) of FIG. 3) from the "LOW" level to the "HI" level. Then the CLK and power-source control circuit 9 outputs the "HI" level signal to the CPU power source circuit 11 and the timer 13. When the voltage changeover signal DN is the "HI" level, the CPU power source circuit 11 changes the CPU power source voltage Vc from the low voltage (1.4V) to the high voltage (1.6V) (step S109). The timer 13 starts its count-up operation (step S110).

When the timer 13 completes its counting operation, it outputs the time-out signal T13 to inform the CLK and power-source control circuit 9 that the output voltage of the CPU power-source circuit 11 has been completely changed. In response to the time-out signal T13, the CLK and power-source control circuit 9 changes the CLK changeover signal CL ((c) of FIG. 3) to the "HI" level and then outputs it to the CLK generator 10 and the timer 12.

In response to the CLK changeover signal CL in a "HI" level, the CLK generator 10 gradually changes the clock frequency from a low frequency (33 MHz) to a high frequency (66 MHz) (step S111). The timer 12 starts the count-up operation (step S112). When the counting operation completes, the timer 12 transmits the time-out signal T12 to the CLK and power-source control circuit 9 to inform it that the frequency of the CLK generator 10 has been completely changed. In the following operations, the flow returns to the step S103 shown in FIG. 2 to repeat the above-mentioned temperature control.

Figure 4:
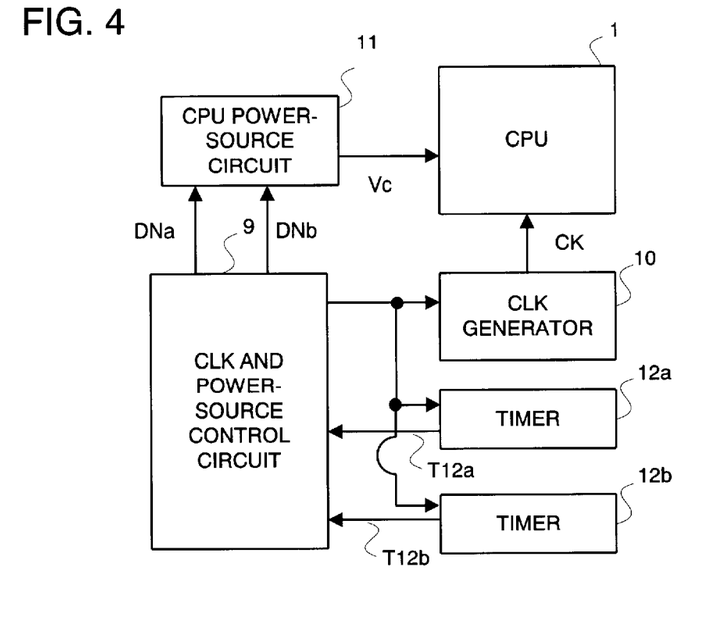
FIG. 4 is a block diagram illustrating the configuration of a temperature control circuit according to a second embodiment of the present invention.

FIG. 4 is a block diagram illustrating the configuration of a temperature control circuit according to a second embodiment of the present invention. Referring to FIG. 4, the time period during which the CLK generator 10 varies the clock frequency from 66 MHz to 50 MHz is set to the timer 12a. The time period during which the CLK generator 10 varies the clock frequency from 66 MHz to 33 MHz is set to the timer 12b.

The voltage changeover signal DNa is the signal that is output to the CPU power source circuit 11 when the CLK and power-source control circuit 9 receives the time-out signal T12a. The voltage changeover signal DNb is the signal that is output to the CPU power-source circuit 11 when the CLK and power-source control circuit 9 receives the time-out signal T12b.

Figure 5:
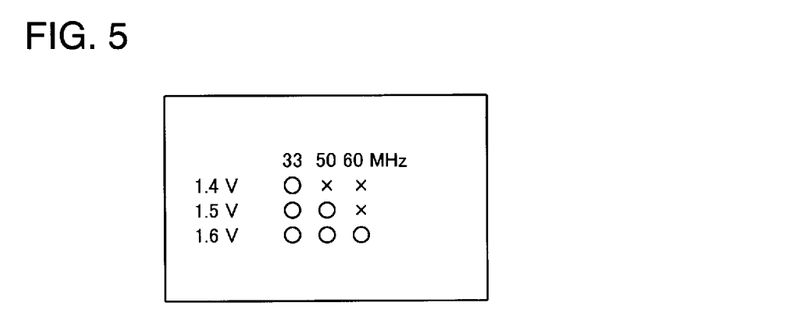
FIG. 5 shows relationships between clock frequencies and power-source voltages in the operational specification of the CPU 1.

FIG. 5 is a table illustrating the relationship between clock frequencies and power source voltages in the operational specifications of the CPU 1. When the power source voltage of the CPU 1 is 1.6V, the CPU 1 is operable at a clock frequency of 33 MHz, 50 MHz, or 66 MHz. When the power source voltage of the CPU 1 is 1.5V, the CPU 1 is operable at a clock frequency of 33 MHz and 50 MHz. When the power source voltage of the CPU 1 is 1.4V, the CPU 1 is operable at a clock frequency of 33 MHz.

Figure 6:
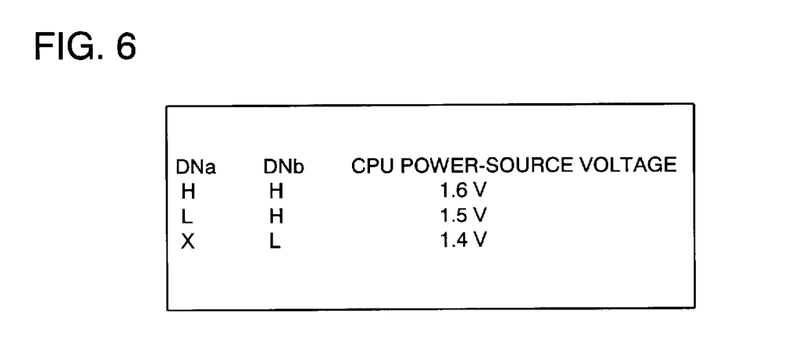
FIG. 6 shows relationships between voltage changeover signals and power-source voltages supplied to the CPU 1.

FIG. 6 shows the relationship between voltage changeover signals DNa, voltage changeover signals DNb, and power source voltages supplied to the CPU 1 by the CPU power source circuit 11. When the voltage changeover signals DNa and DNb are in a "HI" level, the CPU power source circuit 11 supplies a voltage of 1.6V to the CPU 1. When the timer 12a completes its counting operation and the voltage changeover signal DNa is in an "LOW" level, the output voltage of the CPU power source circuit 11 is changed to 1.5V. When each of the timers 12a and 12b completes its counting operation and the voltage changeover signals DNa and DNb are in an "LOW" level, the output voltage of the CPU power source 11 is changed to 1.4V.

Figure 7:
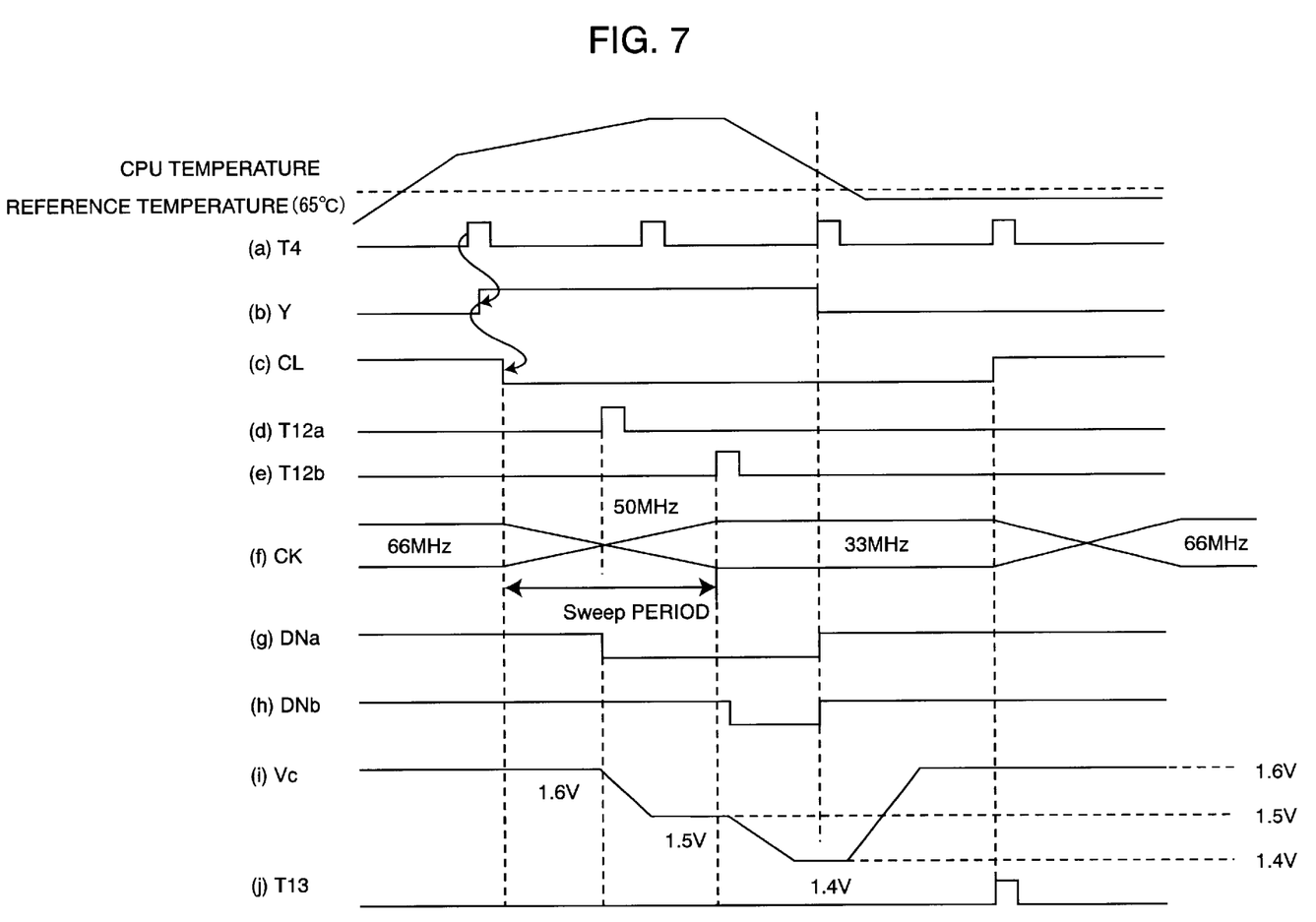
FIG. 7 shows a timing chart for the circuit configuration shown in FIG. 4.

FIG. 7 is a timechart illustrating signal statuses at various portions of the temperature control circuit of FIG. 4. Now, the operation of the temperature control circuit will be described with reference to FIG. 7. In this embodiment, it is assumed that a reference value temperature of 65° C. is set to the CPU temperature reference value set register 7. Moreover, it is assumed, in the initial state of the CPU 1 immediately after the power is turned on, that the clock frequency is a high frequency, that the power source voltage is a high voltage, and that the temperature is at a room temperature (10° C. to 20° C.).

Figure 2:
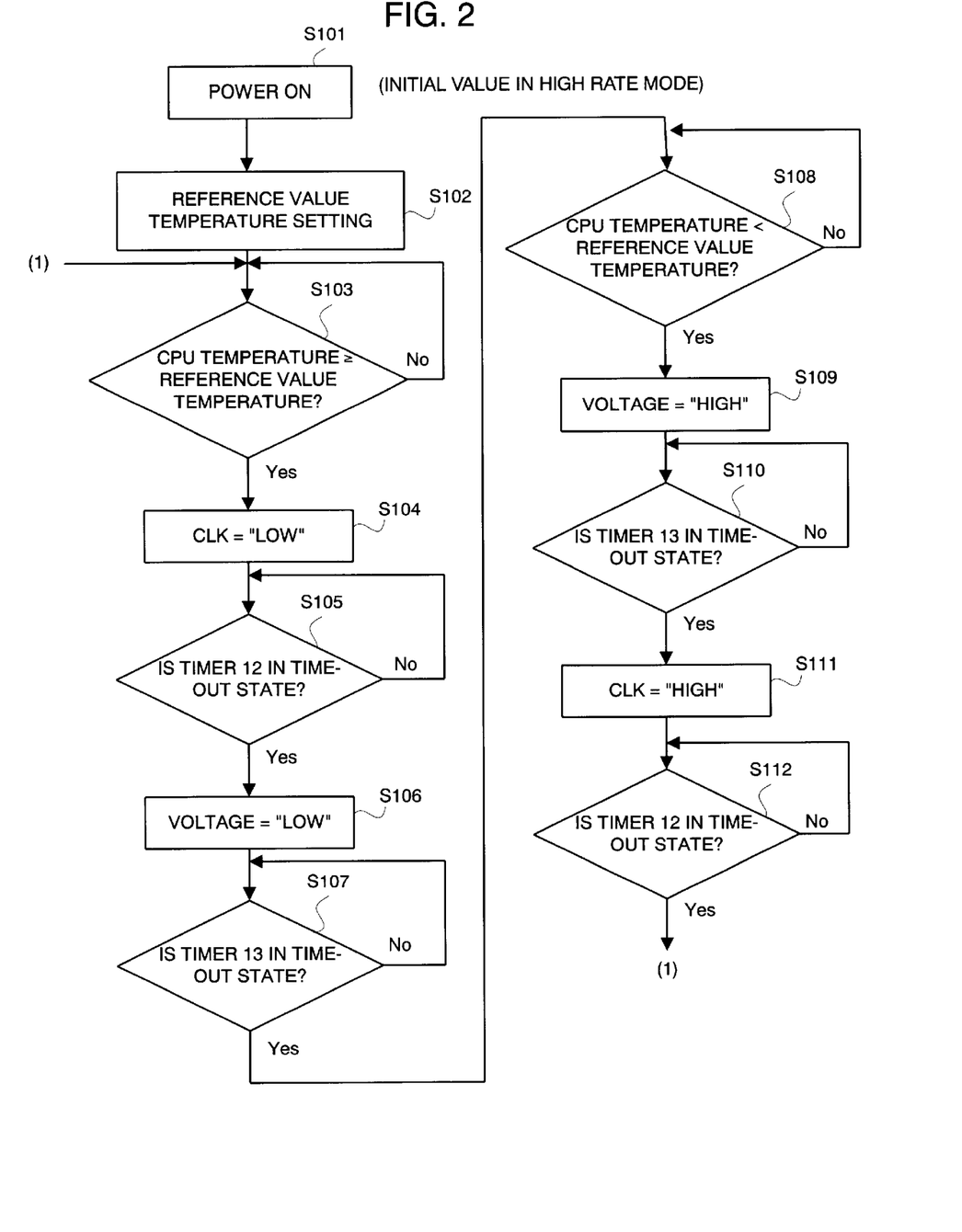
FIG. 2 is a flowchart explaining the operation of the circuit configuration of FIG. 1.

When the system is powered on, the steps S101 to S103 of FIG.2 are first executed. In the comparison operation in the step S103, when the CPU temperature information TEc is lower than the reference value temperature information TEb, the comparator 8 maintains the comparison result Y in an "LOW" state. When the comparison result Y is in an "LOW" state, the CLK and power-source control circuit 9 maintains the clock frequency of the CPU 1 at 66 MHz and the output of the power source voltage at 1.6 V.

Next, when the CPU temperature is higher than the CPU reference value temperature, the comparator 8 rises the output Y to the "HI" level ((b) of FIG. 7) and then outputs it to the CLK and power-source control circuit 9. When the output Y of the comparator 8 rises to the "HI" level, the CLK changeover signal CL falls from "HI" to "LOW" ((c) of FIG. 7). Thus, the CLK and power-source control circuit 9 outputs the CLK changeover signal CL in the "LOW" level to the CLK generator 10 and the timers 12a and 12b. When the CLK changeover signal CL falls to an "LOW" level, the CLK generator 10 gradually changes the clock frequency from 66 MHz to 33 MHz. Then, each of the timers 12a and 12b starts its counting operation.

When the clock frequency of the clock generator 10 is changed from 66 MHz to 50 MHz, the timer 12a completes its counting operation. Thus, the time-out signal T12a rises ((d) of FIG. 7). When the time-out signal T12a rises, the CLK and power-source control circuit 9 rises the voltage changeover signal DNa ((g) of FIG. 7). When the voltage changeover signal DNa falls, the CPU power source circuit 11 drops the CPU power source voltage Vc to 1.5V ((i) of FIG. 7).

Next, when the clock frequency of the CLK generator 10 changes from 50 MHz to 33 MHz, the time-out signal T12b rises ((e) of FIG. 7) while the CLK and power-source control circuit 9 drops the voltage changeover signal DNb ((h) of FIG. 7). Thus, the CPU power source circuit 11 changes the CPU power source voltage Vc from 1.5 V to 1.4V ((i) of FIG. 7). The subsequent operation follows the steps S108 to S103 in FIG. 2.

Figure 8:
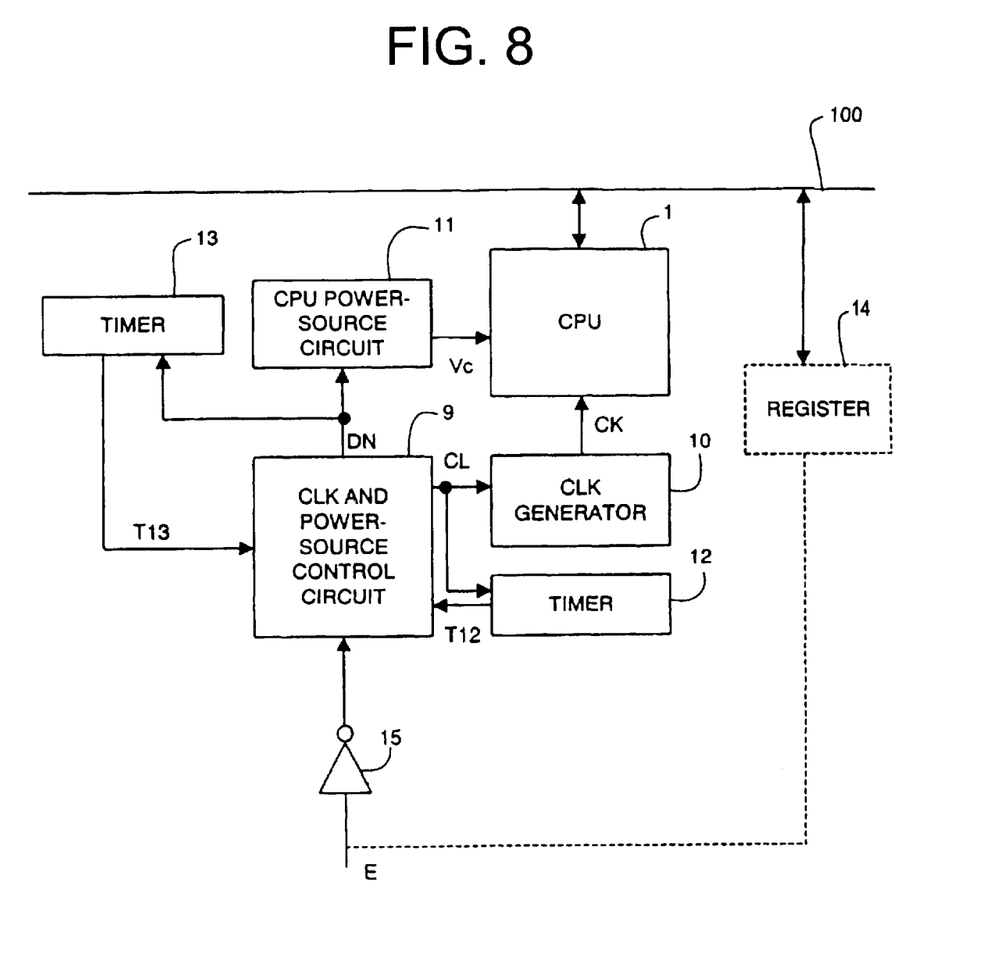
FIG. 8 is a block diagram illustrating the configuration of a temperature control circuit according to a third embodiment of the present invention.

Next, the third embodiment of the present invention will be explained below with reference to FIG. 8. Referring to FIG. 8, symbol E represents a capability changeover signal for inputting external information. The case where the capability changeover signal E is applied to a notebook-type computer will be explained below as an example. The capability changeover signal E is input to the inverter 15. When the computer is battery-powered, the capability changeover signal E is in an "LOW" level. When the computer is driven with an ac adapter, the capability changeover signal E is in a "HI" level. Before the power is turned on, the notebook-type computer is ac-driven. Meanwhile, the clock frequency is 66 MHz and the power source voltage is 1.6 V.

When the power is turned on, the inverter 15 inverts the capability changeover signal E from the "HI" level to the "LOW" level and then outputs the inverted signal to the CLK and power-source control circuit 9. When the inverter receives the "LOW" level signal, the CLK and power-source control circuit 9 maintains the output status, with the clock frequency of 66 MHz and with the power source voltage of 1.6 V.

Next, when the computer is changed to a battery driven mode, the inverter 15 receives the capability changeover signal E of the "LOW" level. When the capability signal E is in an "LOW" level, the inverter 15 outputs the inverted signal in the "HI" level to the CLK and power-source control circuit 9. When the inverter 15 outputs the "HI" level signal, the CLK and power-source control circuit 9 switches the clock frequency from 66 MHz to 33 MHz and switches the power source from 1.6 V to 1.4 V. This operation is controlled in a manner similar to the first embodiment.

A one-bit register 14 is prepared to which data is written by the CPU 1. The output of the register 14, in stead of the capability changeover signal E, may be input to the inverter 15. This allows the power consumption of the CPU 1 to be controlled with software.

Figure 9:
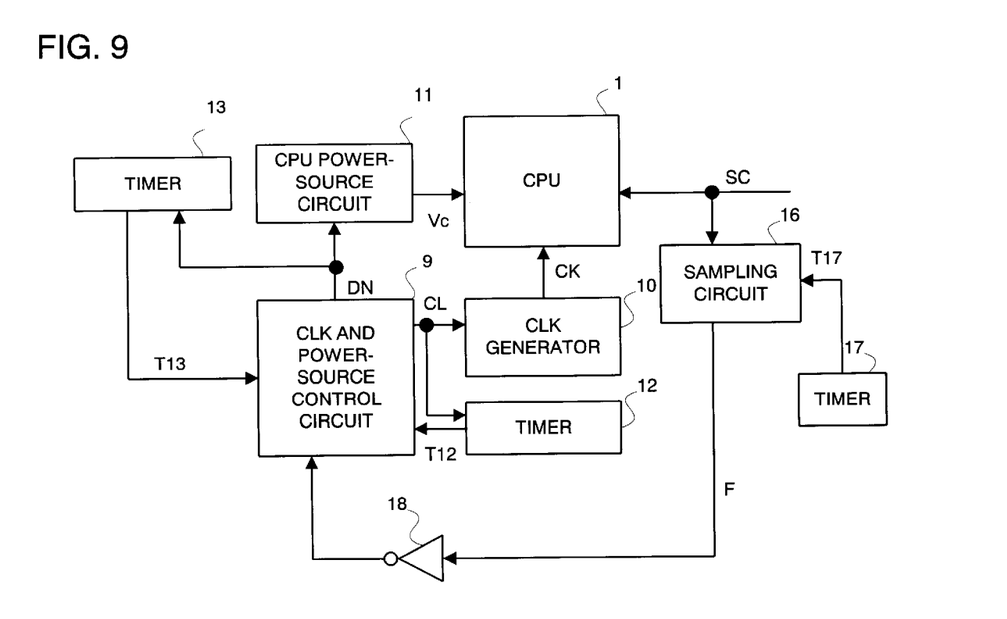
FIG. 9 is a block diagram illustrating the configuration of a temperature control circuit according to a fourth embodiment of the present invention.

FIG. 9 is a block diagram illustrating the configuration of a temperature control circuit according to the fourth embodiment of the present invention. Referring to FIG. 9, symbol SC represents a STOPCLK signal of effecting the power saving function when the full-speed performance of the CPU 1 is not required and halting the processing operation of the CPU 1. When the STOPCLK signal is in an "HI" level, the CPU 1 implements its processing operation, with a high clock frequency (66 MHz) and with a high power source voltage (1.6 V). When STOPCLK signal is in an "LOW" level, the CPU 1 halts its processing operation. The notebook-type computer often uses the STOPCLK signal to save the operational power.

Numeral 16 represents a sampling circuit that stores the STOPCLK signal SC. When sampling circuit reads the STOPCLK signal SC in response to the signal from the timer 17 and then outputs it as a changeover signal F to the inverter 18. The inverter 18 inverts the changeover signal F and then outputs the inverted signal to the CLK and power-source control circuit 9.

Next, the operation of the above configuration will be explained below by referring to the operational timing chart of FIG. 10. It is now assumed, at power-on, that the STOPCLK signal SC is in a "HI" level and that the clock frequency of the CPU 1 is 66 MHz and that the power source voltage is 1.6 V.

Figure 10:
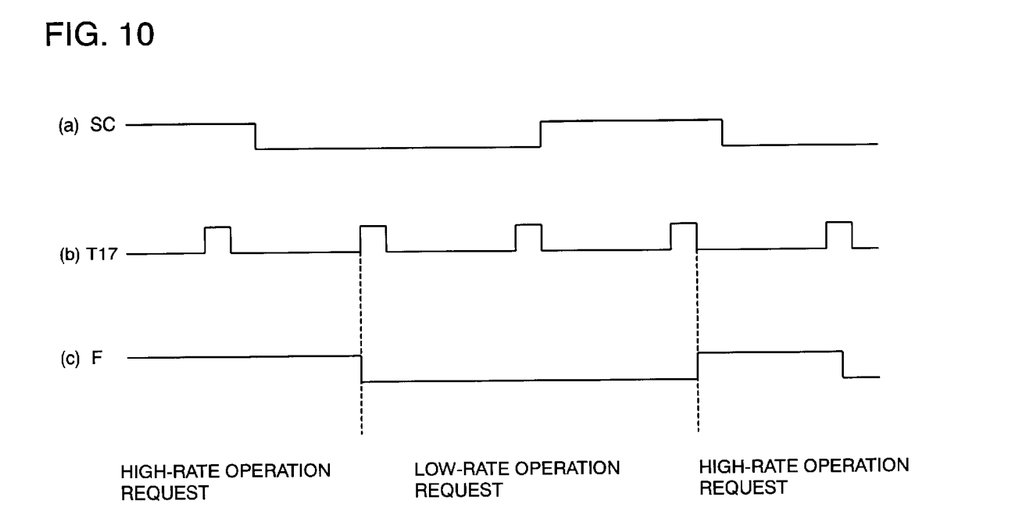
FIG. 10 shows a timing chart for the circuit configuration shown in FIG. 9.

In such a state, when the signal of the timer 17 rises, the sampling circuit 16 reads the STOPCLK signal SC of the "HI" level and then outputs it as the data changeover signal F ((c) of FIG. 10) to the inverter 18. The inverter 18 inverts the changeover signal F from the "HI" level to the "LOW" level and then outputs the inverted signal to the CLK and power-source control circuit 9. Because of the "LOW" input signal, the CLK and power-source control circuit 9 maintains the clock frequency at 66 MHz and the power source voltage at 1.6V.

Next, when the STOPCLK signal SC falls to the "LOW" level (((a) of FIG. 10), the sampling circuit 16 falls the changeover signal F to the "LOW" level with the next timing of the timer 17 ((c) of FIG. 10) and outputs it to the inverter 18. When the inverter 10 inverts the changeover signal F from the "LOW" level to the "HI" level and then outputs it to the CLK and power-source control circuit 9. Since the input signal is in the "HI" level, the CLK and power-source control circuit 9 changes the clock frequency to 33 MHz and changes the power source voltage to 1.4 V. The clock frequency switching operation and the power source voltage switching operation are similar to those in the first embodiment.

Next, when the STOPCLK signal SC rises to the "HI" level ((a) of FIG. 10), the sampling circuit 16 rises the changeover signal F to the "HI" level ((c) of FIG. 10). When the inverter 18 inverts the changeover signal F from the "HI" level to the "LOW" level and then outputs it to the CLK and power-source control circuit 9. When the input signal is in the "LOW" level, the CLK and power-source control circuit 9 changes the clock frequency to 66 MHz and the power source voltage to 1.6 V. The switching operation of the clock frequency and the switching operation of the power source voltage are similar to those in the first embodiment.

As described above, in the mode switching operation according to the present invention, after the clock frequency is first changed from a high frequency to a low frequency, the power source voltage is changed from a high voltage to a low voltage. Otherwise, after the power source voltage is first changed from a low voltage to a high voltage, the clock frequency is changed from a low frequency to a high frequency. Hence, it can be guaranteed that the operational specifications of the CPU are satisfied in the switching operations of the clock frequency and the power source voltage. As a result, a failure or erroneous operation of the CPU due to the mode switching operation of the clock frequency or power source voltage can be prevented.

According to the present invention, the temperature control circuit includes the first timer to which the clock frequency changeover time is previously set. In the mode switching operation, after the clock frequency is changed from a high frequency to a low frequency, the power source voltage is changed from a high voltage to a low voltage based on the output of the first timer. This allows the power source voltage to be changed from a high voltage to a low voltage at the completion of the clock frequency switching operation. Thus, the time during which a high voltage is supplied to the CPU can be shortened so that the temperature rise of the CPU can be suppressed.

Moreover, the temperature control circuit includes the second timer to which the power-source-voltage changeover time is previously set. In the mode switching operation, after the power source voltage is changed from a low voltage to a high voltage, the clock frequency is changed from a low frequency to a high frequency based on the output of the second timer. This allows the clock frequency to be changed from a low frequency to a high frequency at the completion of the power source voltage switching operation. Thus, the time during which a low frequency clock is supplied to the CPU can be shortened so that a decrease in performance of the CPU can be suppressed to a minimum.

According to the invention, the temperature control circuit includes a third timer to which the time period during which the clock frequency changes from a high frequency to a first low frequency is previously set and a fourth timer to which the time period during which the clock frequency changes from the first low frequency to a second low frequency is previously set. The power source voltage changes from a high voltage to a first low voltage at the time the time period set to the third timer has passed. The power source voltage changes from the first low voltage to a second low voltage at the time the time period set to the fourth timer has passed. Thus, the frequency during the clock frequency changing operation can be detected. As a result, since the power source voltage can be decreased during the clock frequency decreasing operation, the time during which a high power source voltage is supplied to the CPU can be shortened, so that the heat dissipation of the CPU can be more suppressed.

According to the present invention, the clock-frequency switching operation and the power-source-voltage switching operation can be performed by an external input signal. Hence, the clock frequency and the power source voltage of the CPU can be switched controllably and arbitrarily controlled from the outside.

According to the present invention, the signal of indicating that the CPU is driven by a battery or by an ac adapter is input. Hence, in the battery-powered mode, the clock frequency can be changed to a low frequency while the power source voltage can be changed to a low voltage. As a result, the power consumption can be reduced and the battery serviceable life can be prolonged.

According to the present invention, since the temperature control circuit includes the register set by the CPU, the clock frequency and the power source voltage of the CPU can be changed according to the status of the register. Hence, the power consumption can be controlled by software.

According to the present invention, since the CPU operation halt signal is input, the power saving function can work to the CPU while the clock frequency and the power source voltage can be selectively changed. This feature enables the stand-by power of the CPU to be saved, thus improving the power consumption suppression efficiency.

The entire disclosure of Japanese Application No. 11-094194 filed Mar. 31, 1999 including specification, claims, drawing and summary are incorporated herein by reference in its entirely.

What is claimed is:

1. A temperature control circuit f or controlling the temperature of a central processing unit, comprising:

a central processing unit;

a clock generator for supplying clock pulses to said central processing unit;

a power source circuit for supplying a power source voltage to said central processing unit;

temperature measuring means for measuring the temperature of said central processing unit;

a storage section for previously storing a reference temperature value of said central processing unit;

a comparator for comparing a measurement result of said temperature measuring means with said reference value stored in said storage section; and control means for switching a clock frequency of said clock generator from a high frequency to a low frequency when said temperature measurement result is larger than said reference value based on an output from said comparator and, after a changeover time of said clock frequency is completed, switching said power source voltage of said power source circuit from a high voltage to a low voltage, and for switching said power source voltage of said power source circuit from a low voltage to a high voltage when said temperature measurement result is lower than said reference value and, after a changeover time of said power source voltage is completed, switching said clock frequency of said clock generator from a low frequency to a high frequency.

2. The temperature control circuit defined in claim 1, wherein said control means comprises:

a first timer to which said changeover time of said clock frequency is previously set; and a second timer to which said changeover time of said power source voltage is previously set;

wherein said clock frequency is switched based on an output from said first timer and said power source voltage is switched based on an output from said second timer.

3. The temperature control circuit defined in claim 1, wherein said control means comprises:

a third timer to which the time said clock frequency changes from a high frequency to a first low frequency is previously set; and a fourth timer to which the time said clock frequency changes from said first low frequency to a second low frequency is previously set;

wherein said power source voltage is switched from said high voltage to a first low voltage at the time the set time of said third timer has passed and said power source voltage is switched from said first low voltage to a second low voltage at the time the set time of said fourth timer has passed.

4. A temperature control circuit for controlling the temperature of a central processing unit, comprising:

a central processing unit;

a clock generator for supplying clock pulses to said central processing unit;

a power source circuit for supplying a power source voltage to said central processing unit;

control means for switching said clock frequency of said clock generator from a high frequency to a low frequency when an external temperature control signal indicates a temperature drop and, after a changeover time of said clock frequency is completed, switching said power source voltage of said power source circuit from a high voltage to a low voltage, and for switching said power source voltage of said power source circuit from a low voltage to a high voltage when said temperature control signal indicates release of a temperature drop and, after a changeover time of said power source voltage is completed, switching said clock frequency of said clock generator from a low frequency to a high frequency.

5. The temperature control circuit defined in claim 4, wherein said temperature control signal is a signal which notifies whether said central processing unit is driven by a battery or an ac adapter.

6. The temperature control circuit defined in claim 4, wherein said temperature control signal comprises an output of a register, said register being written by said central processing unit.

7. The temperature control circuit defined in claim 4, wherein said temperature control signal comprises an operation halt signal output to said central processing unit.

8. The temperature control circuit defined claim 4, wherein said control means comprises:

a first timer to which the changeover time of said clock frequency is previously set; and a second timer to which the changeover time of said power source voltage is previously set;

wherein said clock frequency is switched based on an output from said first timer and said power source voltage is switched based on an output from said second timer.

9. A method of measuring the temperature of a central processing unit, said central processing unit receiving clock pulses output from a clock generator and operating on a power source voltage output from a power source circuit, comprising the steps of:

previously storing a reference value of temperature of said central processing unit;

measuring the temperature of said central processing unit;

comparing a measurement result with the stored reference value;

switching a clock frequency from a high frequency to a low frequency when the temperature measurement result is larger than the reference value and, after a changeover time of said clock frequency is completed, switching the power source voltage from a high voltage to a low voltage; and switching the power source voltage from a low voltage to a high voltage when the temperature measurement result is lower than the reference value and, after a changeover time of said power source voltage is completed, switching the clock frequency from a low frequency to a high frequency.

10. The temperature control method defined in claim 9, wherein said switching step comprises steps of:

previously setting a first time said clock frequency is changed and a second time said power source voltage is changed; and changing said clock frequency based on said first time and said power source voltage based on said second time.

11. The temperature control method defined in claim 9, wherein said switching step comprises steps of:

previously setting a third time said clock frequency changes is changed from a high frequency to a first low frequency and a fourth time said clock frequency changes from said first low frequency to a second low frequency is previously set;

changing said power source voltage from said high voltage to a first low voltage at the time said third time has passed; and changing said power source voltage from said first low voltage to said second low voltage at the time said fourth time has passed.

12. A method of measuring the temperature of a central processing unit, said central processing unit receiving clock pulses output from a clock generator and operating on a power source voltage output from a power source circuit, comprising the steps of:

switching said clock frequency from a high frequency to a low frequency when an external temperature control signal indicates a temperature drop and, after a changeover time of said clock frequency is completed, switching said power source voltage from a high voltage to a low voltage; and switching said power source voltage from a low voltage to a high voltage when said temperature control signal indicates release of a temperature drop and, after a changeover time of said power source voltage is completed, switching said clock frequency from a low frequency to a high frequency.

13. The temperature control method defined in claim 12, wherein said temperature control signal is a signal which notifies whether said central processing unit is driven by a battery or an ac adapter.

14. The temperature control method defined in claim 12, wherein said temperature control signal comprises an output of a register, said register being written by said central processing unit.

15. The temperature control method defined in claim 12, wherein said temperature control signal comprises an operation halt signal output to said central processing unit.

16. The temperature control method defined in claim 12, wherein said switching step comprises steps of:

previously setting a first time said clock frequency is changed and a second time said power source voltage is changed; and changing said clock frequency based on said first time and said power source voltage based on said second time.

* * * * *